Figure 1:
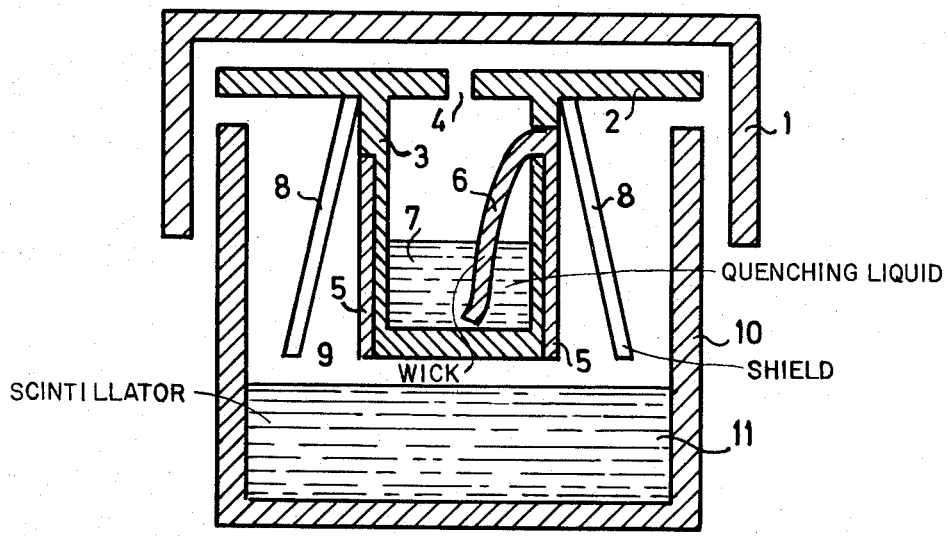

United States Patent [19]
Reunanen

[11] 3,763,371
[45] Oct. 2, 1973

[54] METHOD AND APPARATUS FOR OBTAINING THE RELATION BETWEEN THE CHANNELS RATIO AND THE EFFICIENCY IN A LIQUID SCINTILLATION STANDARD SAMPLE

[75] Inventor: Matti Antero Reunanen, Turku, Finland

[73] Assignee: Wallac Oy, Turku, Finland

[22] Filed: June 3, 1971

[21] Appl. No.: 149,692

[30] Foreign Application Priority Data
June 3, 1970 Finland .............................. 1573/70

[52] U.S. Cl. ................. 250/252, 250/366, 250/496
[51] Int. Cl. .......................................... G01j 39/18
[58] Field of Search .................. 250/71.5, 106 SC, 250/83 SA

[56] References Cited
UNITED STATES PATENTS
| | | | |
|---|---|---|---|
| 3,500,447 | 3/1970 | Frank | 250/71.5 R |
| 3,381,130 | 4/1968 | Nather | 250/71.5 R |
| 3,610,928 | 10/1971 | Thomas | 250/71.5 R |

Primary Examiner—James W. Lawrence
Assistant Examiner—Harold A. Dixon
Attorney—Arnold B. Christen et al.

[57] ABSTRACT

A method and apparatus for obtaining the relation between the channels ratio and the counting efficiency of a liquid scintillation standard sample includes the transfer of a gaseous quencher from one vessel by means of an absorbent transfer medium to another vessel containing the liquid scintillation standard sample and plotting the light pulses obtained during the transfer.

5 Claims, 2 Drawing Figures

METHOD AND APPARATUS FOR OBTAINING THE RELATION BETWEEN THE CHANNELS RATIO AND THE EFFICIENCY IN A LIQUID SCINTILLATION STANDARD SAMPLE

The present invention refers to a method and an apparatus for obtaining the relation between the channels ratio and the counting efficiency in a liquid scintillation standard sample at varying degrees of quenching.

In certain experiments in liquid scintillation counting measurements one is interested in calculating the total radiation emitted from the sample dissolved in the scintillation liquid. This absolute efficiency can be calculated from the number of light pulses detected by, e.g., a photomultiplier if the degree of quenching due to optical and chemical effects in the sample is known. One method of determining the quenching is the so called channels-ratio method, which is based upon the fact that the ratio between the number of counts within two adjacent amplitude ranges is a function of the counting efficiency.

The calibraton curves that define the relation between the efficiency and the channels ratio has up till now been obtained from a number of samples containing determined quantities of radioactive material and different quantities of quenching liquid. As the amount of radioactive material in each sample is known, the efficiency as well as the channels ratio could be measured from each sample and a calibration curve indicating the efficiency as a function of the channels ratio can be drafted. However, this method of calculating the calibration curve suffers from two essential drawbacks. Firstly the measuring values from which the curve is drafted might be located at points on the curve which are very far from the point used when evaluating the absolute efficiency of the samples measured. Secondly, different calibrating curves are obtained for different scintillators and quenchers which means that in order to obtain appropriate calibration curves for various experiments a large number of sets of standards has to be available. The standards are, however, very expensive because of the fact that the amount of isotope in each standard has to be determined with high accuracy. Due to this high cost each liquid scintillation counter is usually only equipped with one or two sets of standards and it is presumed that the calibration curves obtained from these standards are equal to the curves that should have been obtained from a set of standards containing the same scintillator as used in the experiment. Such an approximation does, however, often imply that a larger error is introduced in the calculations. The purpose of the present invention is therefore to provide a method for obtaining these calibration curves in such a way that the points on the curve could be located at desired position. Another purpose of the invention is to provide an apparatus for carrying out the method which apparatus is cheap and easy to handle. The characteristics of the invention will appear from the claims following the specification.

Figure 2:
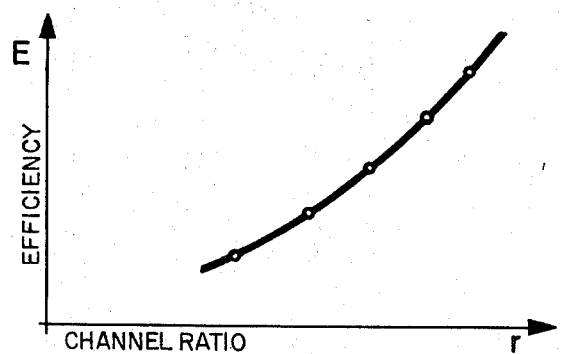

The invention will now be described in detail with reference to the accompanying drawings in which:

FIG. 1 shows an apparatus for carrying out the method according to the invention, and FIG. 2 shows a typical efficiency channel-ratio calibration curve obtained in an apparatus according to FIG. 1.

Referring now to FIG. 1 the apparatus consists of a round plate 2 attached to a container 3, the outer surface of which is covered by a paper or some other liquid absorbing material 5. The container is surrounded by a frustoconical shield 8 which leaves a downwards increasing space 9 between the shield and the container 3. The apparatus further comprises a wick 6 which can be lowered into q quenching liquid 7 in the container 3 and which forms part of the layer 5. Before use the hitherto described apparatus is lowered in a container 10 containing a predetermined amount of radioactive material dissolved in a scintillation liquid. The unit is then sealed by a cap 1. When the wick is brought into contact with the quencher 7, which should have a higher specific gravity than the scintillator 11, the quencher is transferred to the absorbing layer 5. The quencher then evaporates from the layer and migrates into the scintillator 11 in which an increasing degree of quenching will be obtained. The quenching gradient with respect to time in the scintillator will be determined by the shape of the shield 8, as well as the material in the layer 5, the dimensions of the wick 6 and the quenching liquid used.

By measuring and analysing the light pulses obtained from the scintillating liquid 11, e.g., by using a photomultiplier, a curve according to FIG. 2 can be recorded. In the diagram of FIG. 2 the vertical axis indicates the efficiency, i.e., the acitivity measured in relation to the absolute activity of the sample. The horizontal axis indicates the channel ratio, i.e., the ratio between the number of pulses into adjacent amplitude channels. As the scintillator 11 contains a continuously increasing amount of quenching liquid the measuring points on the curve could be chosen arbitrary with respect to one of the axes.

Another essential feature consists therein that since only one radioactive standard is used for obtaining the complete curve it will be much cheaper to provide a laboratory with calibration curves for a number of different quenchers and scintillators and thus adequate calibration curves can be used in most experiments.

We claim:

1. A method for obtaining a calibration curve of the counting efficiency as a function of the channels-ratio at different degrees of quenching from a standard liquid scintillation sample containing a determined amount of radioactive material dissolved in a scintillation liquid, characterized in that a gaseous quencher is dissolved in the sample so as to obtain a quenching gradient during which the sample is analysed with respect to the total number of pulses from the scintillation liquid as well as the channels-ratio.

2. A method according to claim 1, characterized in that the quencher has a higher specific gravity than the scintillation liquid.

3. Apparatus for use in obtaining the relation between the channels ratio and the counting efficiency of a liquid scintillation standard sample, characterized in that it comprises a quencher container, a liquid scintillator container, in which a radioactive material is dissolved, a quencher absorbing material disposed above the scintillation liquid container and means for transferring the quencher from its container to the absorbing material, the quencher evaporated from the absorbing material lowering into the scintillation liquid and forming the quenching gradient with respect to time.

4. Apparatus according to claim 3, characterized in that the quencher container is disposed within the scintillation liquid container, the outer surface of the quencher container being covered by the absorbing material, the quencher container further being provided with a wick via which the quencher is transferred from the quencher container to the absorbing material.

5. Apparatus according to claim 4, characterized in that the quencher container is surrounded by a frusto-conical shield, the shape of which determines the evaporation from the absorbing material.

* * * * *